(12) United States Patent  
Partridge et al.

(10) Patent No.: US 7,427,980 B1  
(45) Date of Patent: Sep. 23, 2008

(54) GAME CONTROLLER SPATIAL DETECTION

(75) Inventors: Ian Partridge, Chandlers Ford (GB); Adam J. Pilkington, Southampton (GB); Simon C. E. Rowland, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/059,698

(22) Filed: Mar. 31, 2008

(51) Int. Cl.
 *G09G 5/00* (2006.01)
(52) U.S. Cl. .......................... 345/156; 345/158; 463/1; 273/148 R; 273/460; 434/307 R
(58) Field of Classification Search ......... 345/156–158, 345/161, 163, 167, 418–427; 463/1, 7, 40–43, 463/51; 434/307 R, 365; 273/460, 461, 273/148 B, 148 R
See application file for complete search history.

(56) References Cited

U.S. PATENT DOCUMENTS 5,788,500 A    8/1998  Gerber
7,031,875 B2   4/2006  Ellenby et al.
7,038,661 B2   5/2006  Wilson et al.
2004/0113887 A1 * 6/2004 Pair et al. ................... 345/156

FOREIGN PATENT DOCUMENTS

WO            9942946 A2    8/1999

* cited by examiner

*Primary Examiner*—Regina Liang
(74) *Attorney, Agent, or Firm*—Dillon & Yudell LLP

(57) ABSTRACT

A method of identifying a specific object representation in a computer simulation is presented. A computer simulation of a physical room is generated and displayed by a game console. A game controller is integrated with a laser rangefinder to create a laser-integrated game controller that is capable of determining and transmitting, to the game console, a real-time location and spatial orientation of a real physical object that is represented by a computer-generated object representation in the computer simulation. The game controller and laser-integrated game controller are able to identify a specific object representation, which corresponds with the real physical object, based on the real-time location of the laser-integrated game controller, the spatial orientation of the laser-integrated game controller, and the range signal from the laser rangefinder in the laser-integrated game controller to the real physical object.

2 Claims, 4 Drawing Sheets

GAME CONTROLLER SPATIAL DETECTION

BACKGROUND OF THE INVENTION

1. Technical Field

The present disclosure relates in general to the field of electronic gaming devices, and more particularly to electronic gaming devices that use hand-held game controllers. Still more particularly, the present disclosure relates to spatial detection using hand-held game controllers.

2. Description of the Related Art

Current gaming technology allows a hand-held game controller to provide a real-time spatial orientation of the hand-held game controller that corresponds with an analog graphical representation on a game screen. For example, a tennis video game will allow a user to "move" a tennis racket on the video screen by physically waving the hand-held controller through the air. However, such systems are limited to only providing analog movement of the hand-held controller within a sensor field of the game console, thus limiting the interactive experience.

SUMMARY OF THE INVENTION

A method of identifying a specific object representation in a computer simulation is presented. A computer simulation of a physical room is generated and displayed by a game console. A game controller is integrated with a laser rangefinder to create a laser-integrated game controller that is capable of determining and transmitting, to the game console, a real-time location and spatial orientation of a real physical object that is represented by a computer-generated object representation in the computer simulation. The game controller and laser-integrated game controller are able to identify a specific object representation, which corresponds with the real physical object, based on the real-time location of the laser-integrated game controller, the spatial orientation of the laser-integrated game controller, and the range signal from the laser rangefinder in the laser-integrated game controller to the real physical object.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
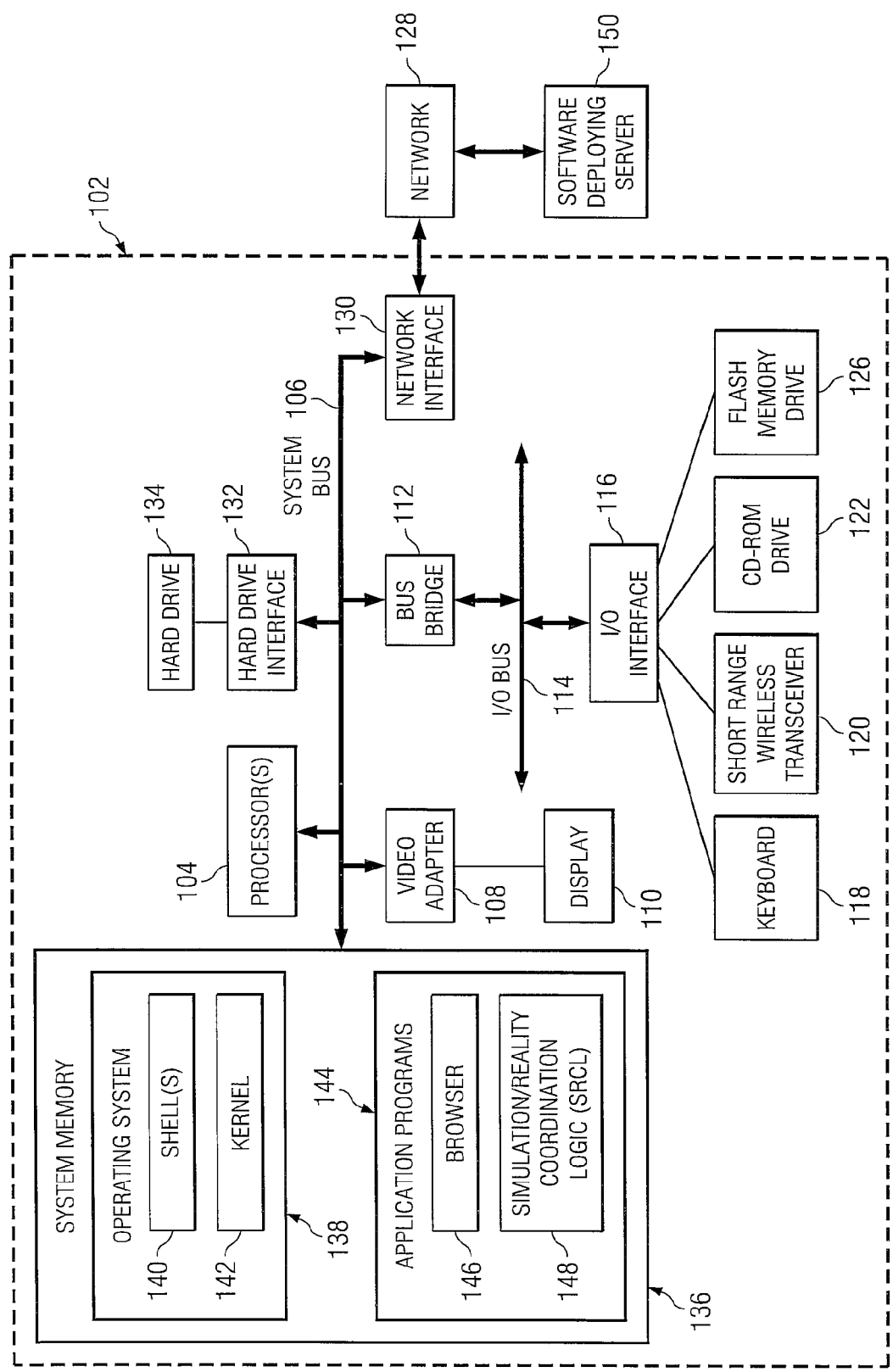
FIG. 1 illustrates an exemplary computer which the present invention may utilize.

With reference now to FIG. 1, there is depicted a block diagram of an exemplary computer 102 in which the present invention may be implemented. Some or all of the architecture shown for computer 102 may be utilized by a software deploying server 150 and/or a game controller 214 (shown below in FIG. 2). Computer 102 includes one or more processors 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a Short Range Wireless Transceiver 120, a Compact Disk-Read Only Memory (CD-ROM) drive 122, and a flash drive memory 126. Keyboard 118 may be a standard keyboard (e.g., QWERTY style or similar), or a condensed alphanumeric keypad. The format of the ports connected to I/O interface 116 may be any known to those skilled in the art of computer architecture, including but not limited to Universal Serial Bus (USB) ports. Short Range Wireless Transceiver 120 utilizes short range wireless electromagnetic signals (e.g. wireless spread spectrum, radio frequency (RF), infrared (IR)) to allow Computer 102 to transmit and receive data, including range-finding signals, with a device such as the laser-integrated game controller 210 depicted below in FIG. 2.

Computer 102 is able to communicate with a software deploying server 150 via a network 128 using a network interface 130, which is coupled to system bus 106. Network interface 130 may utilize wired or wireless technology such as a cellular broadcast to connect with Network 128. Network 128 may be an external network such as the Internet, an internal network such as an Ethernet or a Virtual Private Network (VPN), and/or a wireless cellular telephone network. Note again the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using Hyper-Text Transfer Protocol (HTTP) messaging, thus enabling communication with software deploying server 150.

Application programs 144 in system memory 136 (as well as software of deploying server 150 system memory) also include a Simulation/Reality Coordination Logic (SRCL) 148. SRCL 148 includes code for implementing the processes described in FIGS. 2-4. In one embodiment, computer 102 is able to download SRCL 148 from software deploying server 150, including in an "on demand" basis. Note further that, in one embodiment of the present invention, software deploying server 150 performs all of the functions associated with the present invention (including execution of SRCL 148), thus freeing computer 102 from having to use its own internal computing resources to execute SRCL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
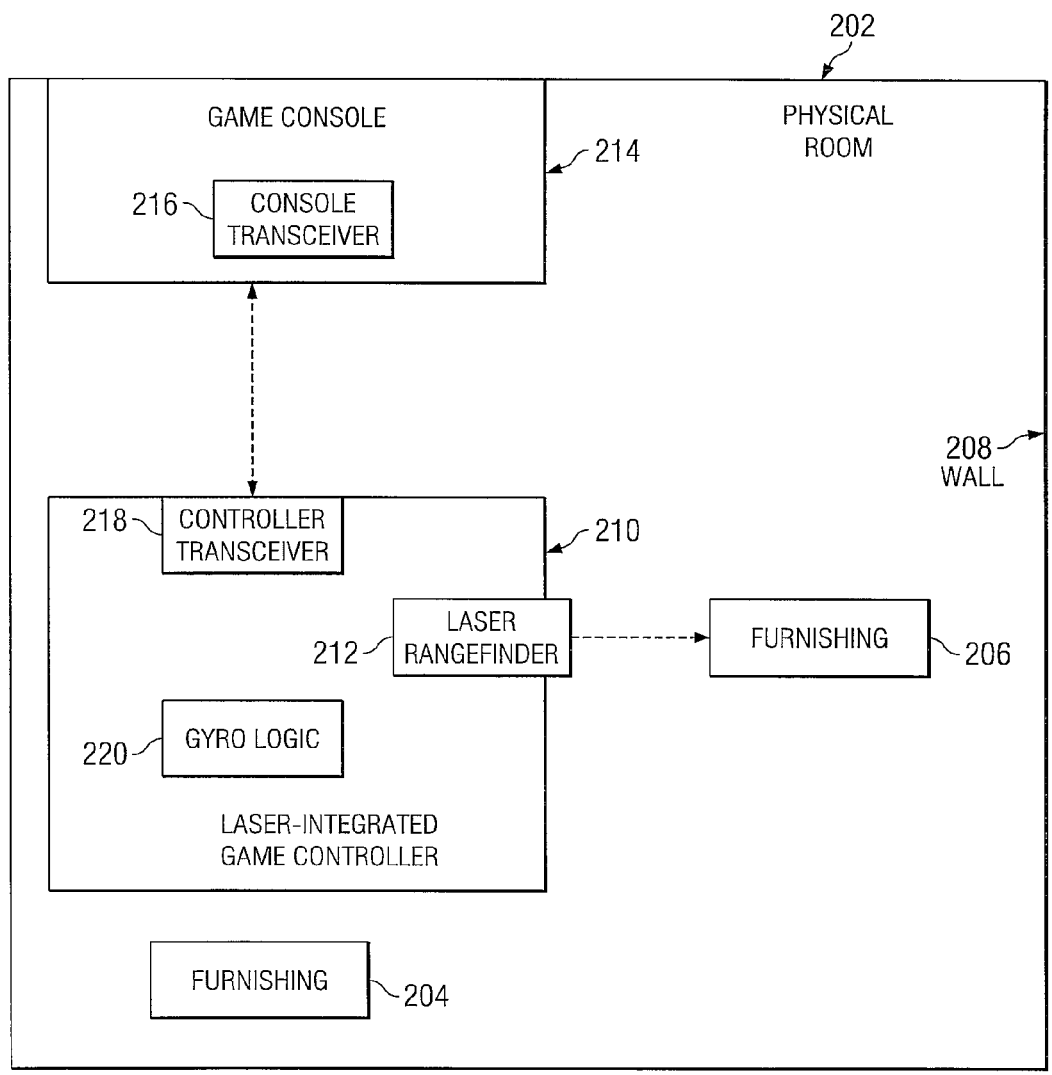
FIG. 2 depicts a real physical room in which a laser-integrated game controller is located.

With reference now to FIG. 2, a physical room 202 contains a real furnishing 204, a real furnishing 206, and a real physical wall 208. These items, and their physical positions within the physical room 202, have previously been simulated by a computer to create a room simulation 302, shown in FIG. 3. This simulation can be performed using any simulation process, including "drag-and-drop" movement of representations, computer animation, laser-scanning, etc.

As shown in FIG. 2, a laser-integrated game controller 210 incorporates the use of an integrated laser rangefinder 212. This laser rangefinder 212 is able to determine the distance between the laser-integrated game controller 210 and any object within the physical room 202. The game console 214 is able to determine the position, movement and spatial orientation of the laser-integrated game controller 210 through the use of interrogation signals between a console transceiver 216 and a controller transceiver 218. These interrogation signals include both a real-time rangefinder signal (e.g., a laser signal) between the laser-integrated game controller 210 and the game console 214, as well as orientation signals from a gyroscopic logic 220 that describe a three-axis orientation of the laser-integrated game controller 210 in real time.

Figure 3:
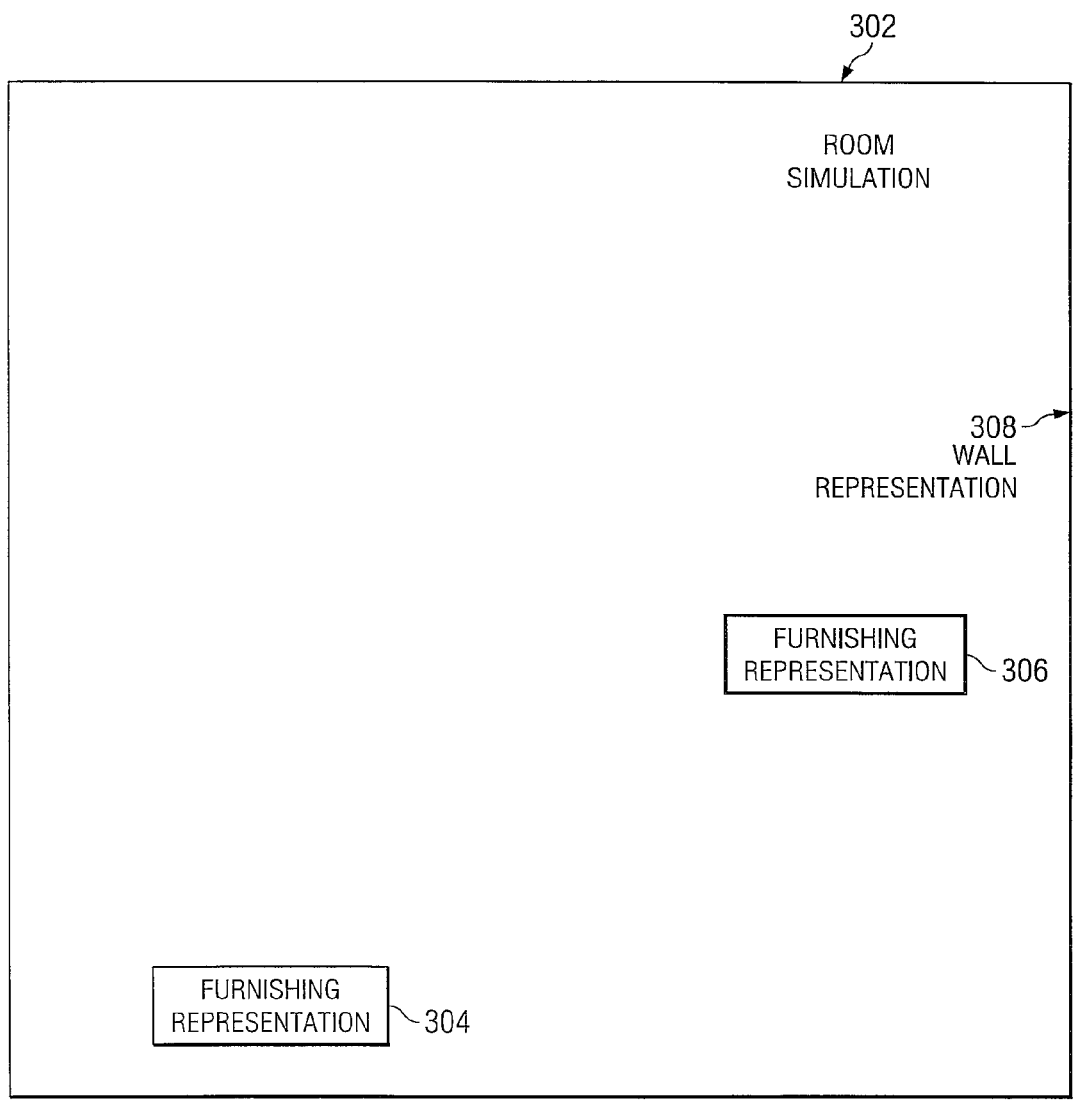
FIG. 3 illustrates a computer simulation of the real physical room shown in FIG. 2.

Note that, as shown in FIG. 2, the laser rangefinder 212 is depicted as transceiving a range-interrogation signal to the furnishing 206. This results in the room simulation 302 (shown in FIG. 3) highlighting the corresponding furnishing representation 306, without changing the appearance or highlight of the furnishing representation 304 and/or the wall representation 308. That is, by pointing and clicking the laser rangefinder 212 at a particular real object in the physical room, whatever object is being pointed at (and identified by the rangefinder distance) has a corresponding representation on the room simulation 302 change appearance. This change in appearance may be a simple highlighting (as shown in FIG. 3), or the detailed appearance of the object may be changed, using a color pallet or other icon (not shown) in the room simulation 302. For example, by highlighting the furnishing representation 306, which may be an upholstered chair, the type and color of upholstery depicted in the furnishing representation 306 may be selectively changed by the user of the laser-integrated game controller 210 (e.g., by typing in a selection on the game console 214). Similarly, if the user had been pointing the laser rangefinder 212 at the wall 208, the user may have been able to change the color of the wall representation 308 in the room simulation 302. Thus, the system depicted allows a user to point to and identify a real object in the room, in order to identify, highlight and/or change a corresponding representation in a simulation of that room.

Figure 4:
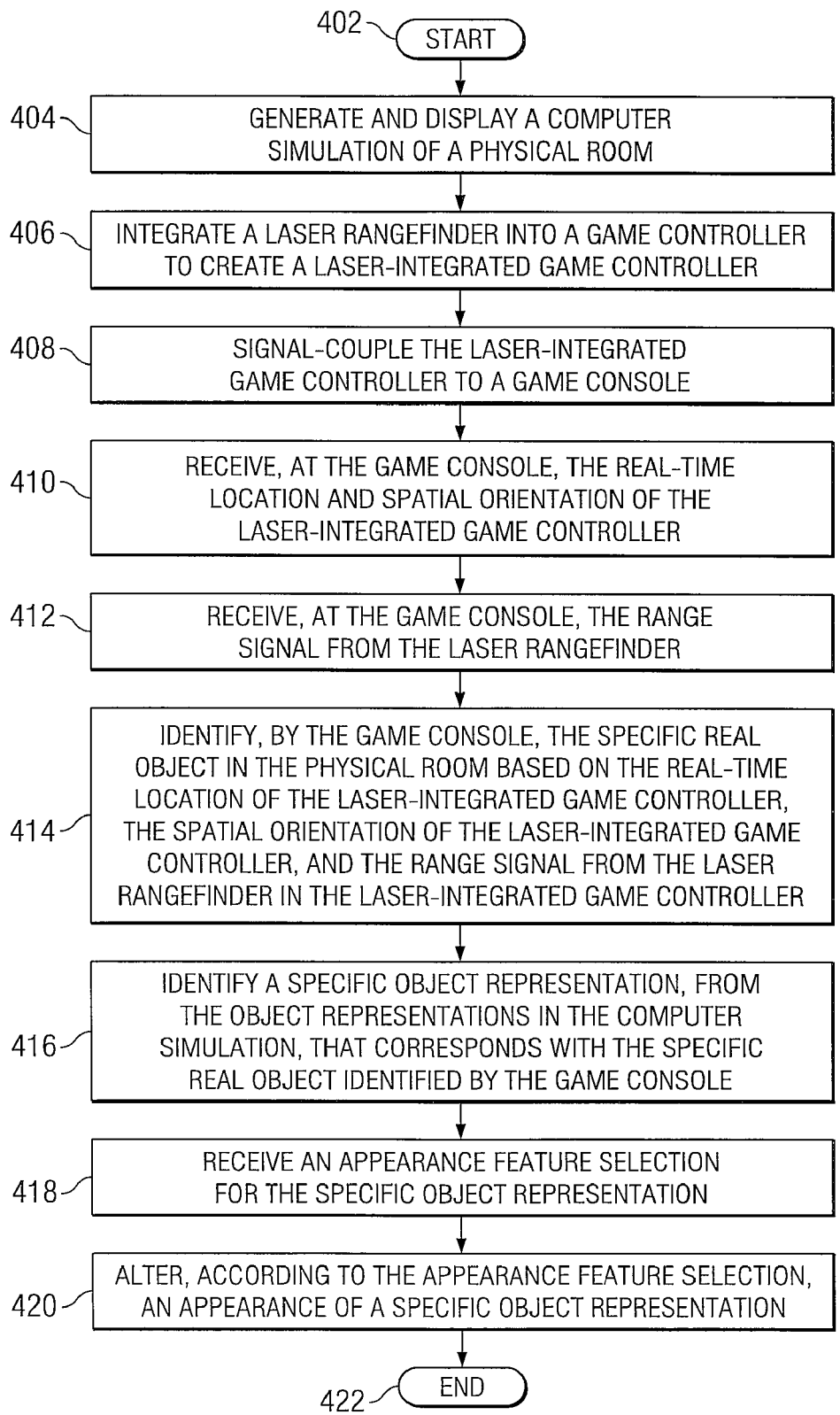
FIG. 4 is a high-level flow-chart of steps taken to identify and alter a specific object representation in the computer simulation.

Referring now to FIG. 4, a high-level flow chart of exemplary steps taken to identify a specific object representation in a computer simulation is presented. After initiator block 402, a computer simulation of a physical room is generating and displaying on a video display (block 404). The physical room may contain/include real objects, such as a wall and a furnishing. The computer simulation includes object representations, such as a wall representation of the wall and a furnishing representation of the furnishing. As described in block 406, a laser rangefinder is integrated into a game controller to create a laser-integrated game controller. The laser-integrated game controller is signal-coupled to a game console (block 408). The laser-integrated game controller is capable of determining and transmitting, to the game console, a real-time location and spatial orientation of the laser-integrated game controller within the physical room. Furthermore, the laser rangefinder is capable of determining and transmitting, to the game console, a range signal that describes a distance from the laser-integrated game controller to one of the real objects in the physical room.

As described in block 410, the game console receives the real-time location and spatial orientation of the laser-integrated game controller. The game console also receives the range signal from the laser rangefinder (block 412). This range signal is generated when the laser rangefinder is pointed at a specific real object selected from the real objects in the physical room. The game console then identifies the specific real object in the physical room based on the real-time location of the laser-integrated game controller, the spatial orientation of the laser-integrated game controller, and the range signal from the laser rangefinder in the laser-integrated game controller (block 414). A specific object representation, from the object representations in the computer simulation, is identified (block 416). This specific object representation corresponds with the specific real object identified by the game console. The game console (or other associated logic found in a computer such as computer 102 shown in FIG. 1) can then receive an appearance feature selection for the specific object representation (block 418). The game console can then alter, according to the appearance feature selection, an appearance of a specific object representation (block 420). The process ends at terminator block 422.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of identifying a specific object representation in a computer simulation, the method comprising:

generating and displaying a computer simulation of a physical room, wherein the physical room comprises real objects that comprise a wall and a furnishing, and wherein the computer simulation comprises object representations that comprise a wall representation of the wall and a furnishing representation of the furnishing;

integrating a laser rangefinder into a game controller to create a laser-integrated game controller;

signal-coupling the laser-integrated game controller to a game console, wherein the laser-integrated game controller is capable of determining and transmitting, to the game console, a real-time location and spatial orientation of the laser-integrated game controller within the physical room, and wherein the laser rangefinder is capable of determining and transmitting, to the game console, a range signal that describes a distance from the laser-integrated game controller to one of the real objects in the physical room;

receiving, at the game console, the real-time location and spatial orientation of the laser-integrated game controller;

receiving, at the game console, the range signal from the laser rangefinder, wherein the range signal is generated when the laser rangefinder is pointed at a specific real object selected from the real objects in the physical room;

identifying, by the game console, the specific real object in the physical room based on the real-time location of the laser-integrated game controller, the spatial orientation of the laser-integrated game controller, and the range signal from the laser rangefinder in the laser-integrated game controller; and identifying a specific object representation, from the object representations in the computer simulation, that corresponds with the specific real object identified by the game console.

2. The method of claim 1, further comprising:

receiving an appearance feature selection for the specific object representation; and altering, according to the appearance feature selection, an appearance of a specific object representation.

* * * * *